United States Patent [19]
Horiguchi

[11] Patent Number: 6,122,694
[45] Date of Patent: Sep. 19, 2000

[54] SERIAL BUS CONTROLLER

[75] Inventor: Yoshihiro Horiguchi, Kanagawa, Japan

[73] Assignee: NEC Corporation, Tokyo, Japan

[21] Appl. No.: 08/929,887

[22] Filed: Sep. 15, 1997

[30] Foreign Application Priority Data

Sep. 13, 1996 [JP] Japan ................................. 8-243024

[51] Int. Cl.<sup>7</sup> ................................................. G06F 13/00
[52] U.S. Cl. ........................ 710/110; 710/242; 710/244
[58] Field of Search .................................. 710/110, 109, 710/119, 125, 220, 242, 244

[56] References Cited

U.S. PATENT DOCUMENTS 5,311,473 5/1994 McClure et al. ........................ 365/201
5,892,631 4/1999 Howell et al. .......................... 360/51

FOREIGN PATENT DOCUMENTS 363065731 3/1988 Japan.
2-33241 2/1990 Japan.
404150434 5/1992 Japan.
406164595 6/1994 Japan.

*Primary Examiner*—Ayaz R. Sheikh
*Assistant Examiner*—David A. Wiley
*Attorney, Agent, or Firm*—Foley & Lardner

[57] ABSTRACT

A serial bus controller comprises a competition result discriminator for outputting a lost competition signal DB upon detecting a lost competition, by comparing a clock SCK and data SDA on a serial communication bus against a clock CKO and data DAO, respectively, to be output from the own station to find any difference between them, a bus release controller for performing end-of-communication procedures including releasing the serial communication bus in response to the lost competition signal DB, and a slave mode setting section for effecting slave mode setting procedures in response to the lost competition signal DB and based on the data SDA on the serial communication bus.

10 Claims, 4 Drawing Sheets

SERIAL BUS CONTROLLER

BACKGROUND OF THE PRESENT INVENTION (a) Field of the present invention

The present invention relates to a serial bus controller used in a microcomputer-applied device for controlling a serial communication bus connected to a plurality of microcomputer-applied devices, any of which is a candidate for the master device on the serial communication bus.

(b) Description of the Related Art

Recently, as a higher level is achieved in the function and performance of the microcomputer-applied devices, the volume of data to be communicated between microcomputer-applied devices, or computer stations, has been increased. This tendency highlights the importance of the performance in data communication between the microcomputer-applied devices, which includes a higher reliability in data communication as well as a higher speed.

Any of the microcomputer-applied devices of this sort itself can be a candidate for the master device on the serial communication bus which plays a leading role in the data communication during a certain interval. In a data communication system including a plurality of such candidates on a single serial communication bus, it is not clear which candidate is the master device and which are the slave devices, proper data communication cannot be normally achieved. When a plurality of candidates for the master device simultaneously start communication as the master device, competition takes place among the candidates. In such a circumstance, there is a scheme in the system for selecting one of the candidates as the sole master device by utilizing the interference between the data thus transmitted, which eventually specifies one or more losers in the competition.

The losers in the competition are requested to release the serial communication bus immediately upon losing the competition, and not to interfere with the communication effected by the winner in the competition, or master device. Besides, the loser must perform an after-treatment for the failed communication which becomes due as a result of the lost competition, as well as preparation procedures as a slave device possibly assigned by the master device.

FIG. 1 is a block-diagram showing a conventional serial bus controller in a computer station. The conventional serial bus controller 10 for controlling data communication through a serial communication bus 17 comprises a competition result discriminator 11 and a serial communication section 12. The competition result discriminator 11 compares a clock signal SCK and the contents of data SDA appearing on the serial communication bus 17 against a clock signal CKO and the contents of data DAO, respectively, output from the serial communication section 12 of the own station, to supply a lost competition/interrupt demand signal INTD to a CPU (not shown in the drawing) when the lost competition is detected as a result of the comparison.

The serial communication section 12 comprises a communication controller 13 for controlling the communication through the serial communication bus 17, and generates an end-of-communication/interrupt demand signal INTE after performing normal serial communication procedures. A CPU bus 15 connects the serial bus controller 10 with the CPU· for data transmission, whereas an internal bus 16 connects the serial control section 12 with the CPU bus 15.

The communication controller 31 comprises a bus release controller 31 and a slave mode setting section 32.

With reference to FIG. 2 showing a time-chart of the conventional serial bus controller 10, according to FIG. 1, an example of operations of the conventional serial bus controller 10 will be described, in the event of competition among a plurality of candidates for the master device on the communication bus.

Assume that the serial bus controller 10 of FIG. 1 is in the state of serial data communication (state "M" in FIG. 2), to thereby reveal the own station as one of the candidates for the master device. The competition result discriminator 11 receives the clock signal SCK and the contents of data SDA appearing on the serial communication bus 17, to compare the clock signal SCK and the contents of data SDA with the clock signal CKO and the contents of data DAO, respectively, which are to be output from the own station. The occurrence of the lost competition is decided as a result of the comparison if any difference is recognized in the comparison, and the lost competition/interrupt demand signal INTD is output from the serial communication section 12.

During processing the lost competition interrupt procedures which become due as a result of the lost competition, the CPU provides a command through the internal bus 16 to the bus release controller 31 to halt the output of the clock signal CKO and data DAO from the own station, thereby releasing the communication bus 17 in the procedure "B" in FIG. 2 in order not to interfere with the communication made from the master device, or winner in the competition. Further, the CPU performs an after-treatment for the failed communication which is due as a result of the lost competition, and provides a command to the slave mode setting section 32 to perform communication preparation procedures for a slave device ("C" in FIG. 2) which may be possibly assigned by the master device.

On the other hand, if the communication by the serial bus controller 10 is finished properly as a result of winning in the competition, the serial communication section 12 outputs the end-of-communication/interrupt demand signal INTE, and the CPU provides a command to the serial bus controller 10 to perform end-of-communication procedures ("D" in FIG. 2) including communication preparation procedures for a slave device which may be possibly assigned by the master device, and to perform preparation procedures for the next communication.

After finishing the above procedures, the serial bus controller 10 which is either in the state of the slave device or in the state of master device moves into an idling state ("RY" in FIG. 2). After the idling state "RY" as a slave device, the serial bus controller 10 works in the state of the master device "M" if the state of the slave device is restored to the state of the master device, or works in the state of slave device "S" if the serial bus controller 10 is assigned as such ("M/S" in FIG. 2). Before arrival at the waiting state "RY" after the lost competition, the serial bus controller 10 must pass through a communication disabled state "V" in FIG. 2, which fact may cause the serial bus controller 10 to delay in responding to a possible assignment for a slave device made by the master device.

As described above, the serial bus controller performs releasing the serial bus and preparation for a slave device in interrupt procedures after detecting the lost competition. In this procedures, the release of the serial bus is sometimes delayed depending on the program processing speed of the CPU or the state of the serial communication bus. Such a delay of the preparation procedures for the slave device and the release of the serial bus causes troubles against the communication from the master device in the serial communication system.

SUMMARY OF THE PRESENT INVENTION

It is an object of the present invention to provide a serial bus controller which can release the communication bus immediately upon detecting the lost competition to thereby avoid the communication troubles, and perform the lost competition procedures in the timing of the normal end-of-communication procedures.

The present invention provides a serial bus controller used in a computer station for controlling serial data communication transmitted through a serial communication bus connected to a plurality of computer stations each constituting a candidate for a master device and a slave device. The serial bus controller comprises a communication controller for outputting a first serial data to reveal the corresponding computer station as a candidate for the master device, a competition result discriminator for comparing the first serial data with second serial data appearing on the serial communication bus to output a lost competition signal upon detecting the difference between the first serial data and the second serial data, and a hardware device including a bus release controller for releasing the serial communication bus in response to the lost competition signal.

In accordance with the present invention, since the hardware device can release the serial communication bus in response to the lost competition signal without a command from a CPU, delay in releasing the serial communication bus and in shifting into a slave device can be eliminated. Accordingly, communication troubles such as lack of a slave device in the serial data communication system can be avoided.

The above and other objects, features and advantages of the present invention will be more apparent from the following description, referring to the accompanying drawings.

DESCRIPTION OF THE PREFERRED EMBODIMENT

Figure 1:
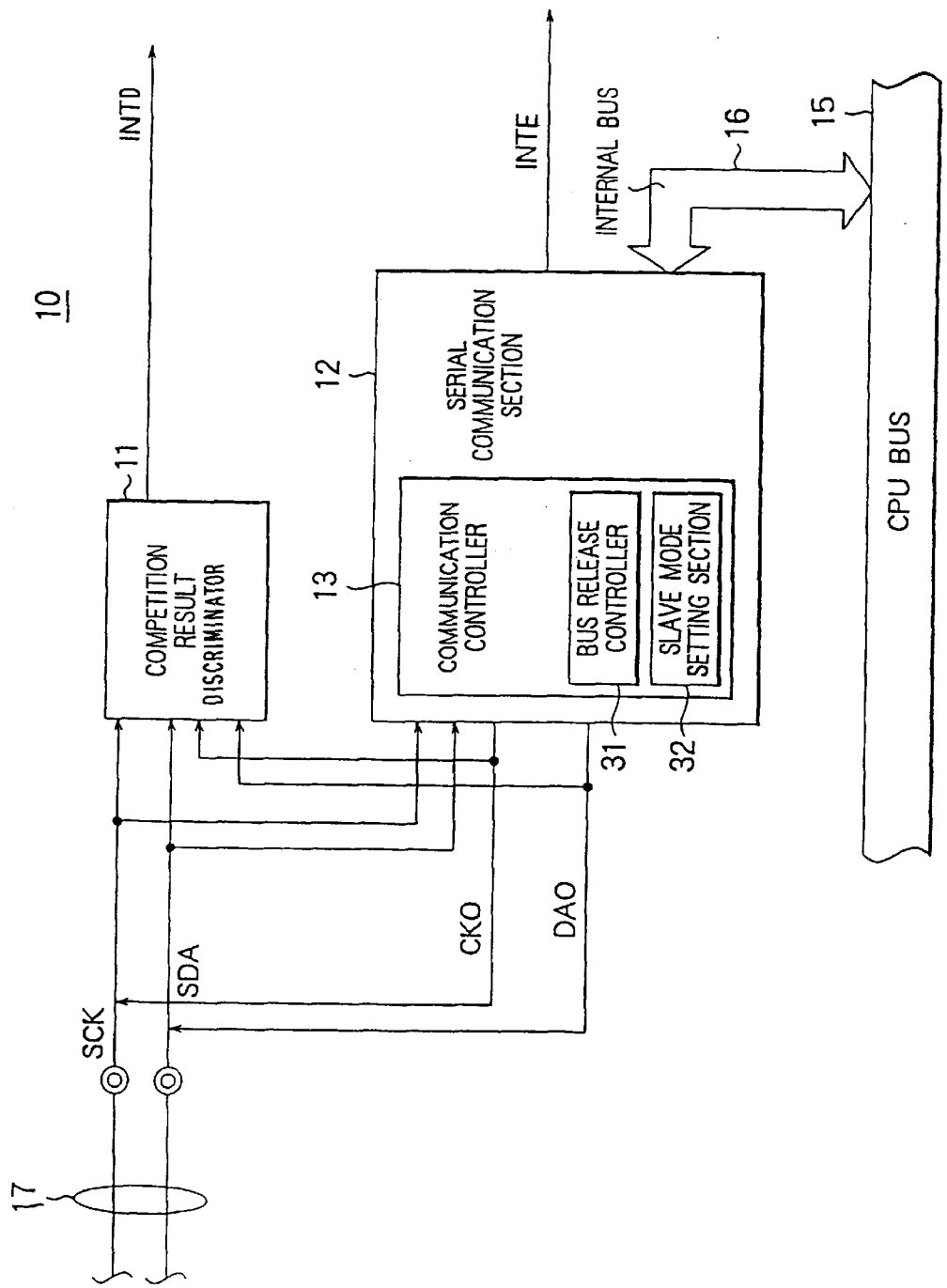
FIG. 1 is a block-diagram of a conventional serial bus controller.
Figure 2:
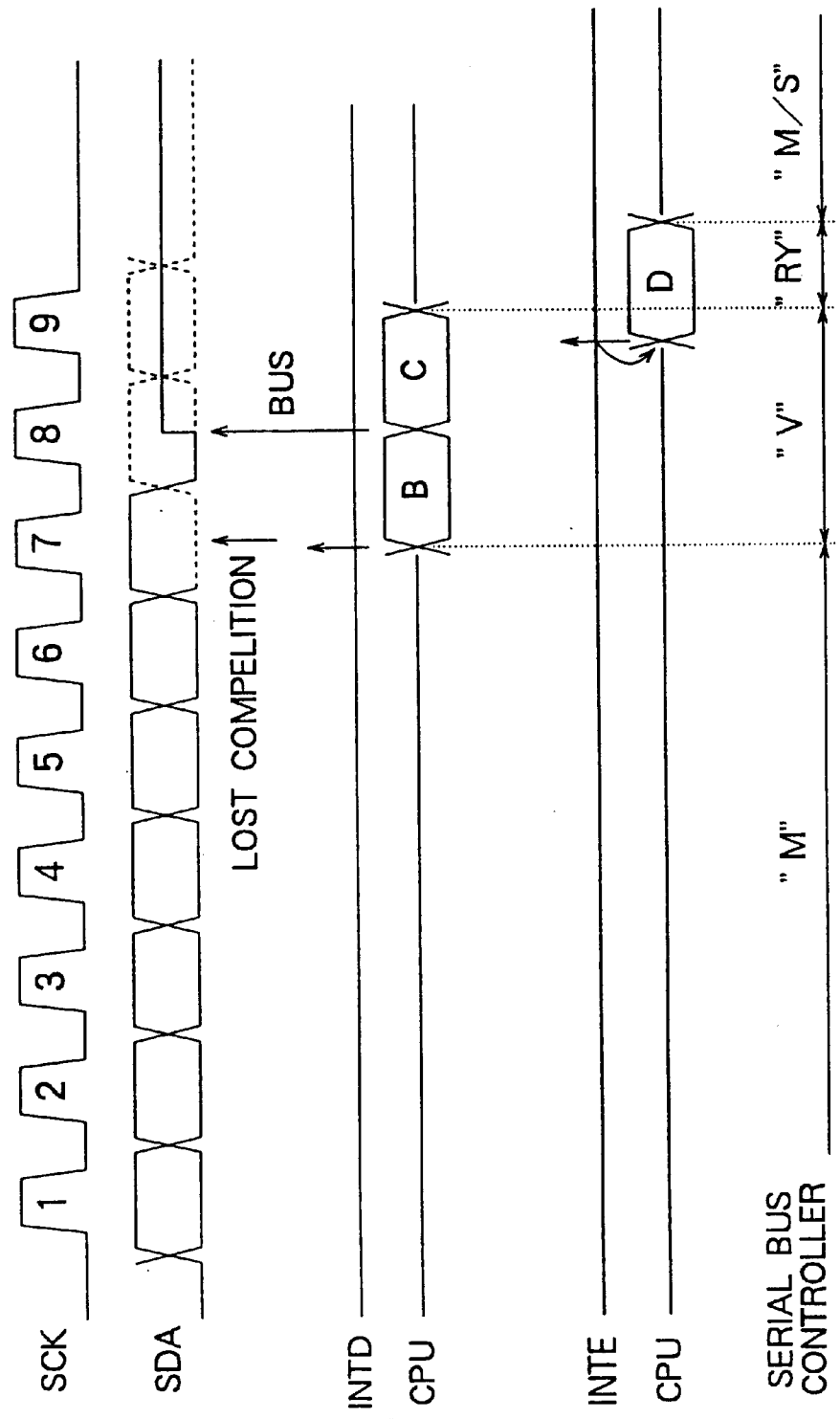
FIG. 2 is a time-chart showing the operation of the serial bus controller of FIG. 1.

Now, the present invention is more specifically described with reference to accompanying drawings, wherein similar constituent elements are designated by the same or related reference numerals throughout the drawings.

Figure 3:
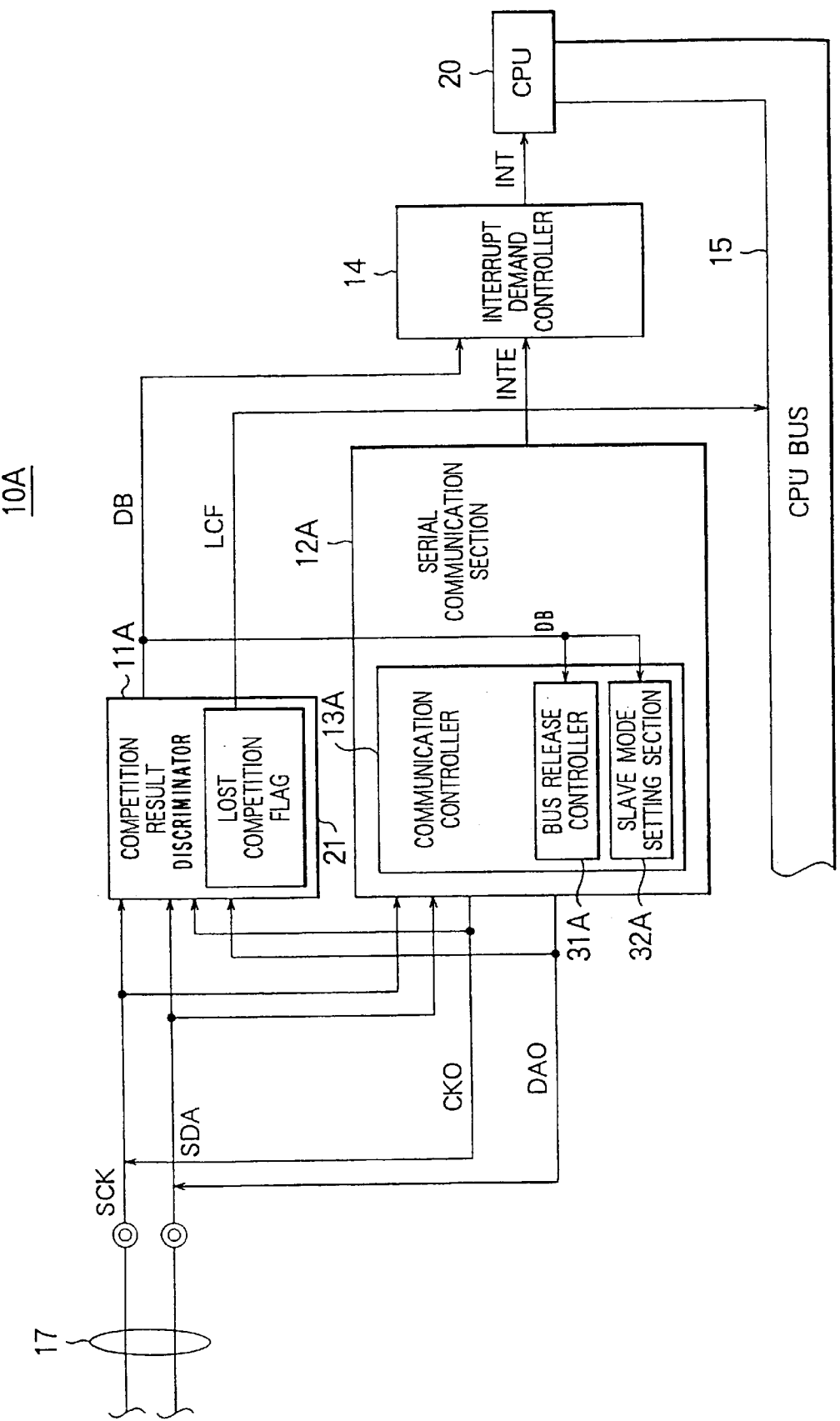
FIG. 3 is a block-diagram of a serial bus controller according to an embodiment of the present invention.

Referring to FIG. 3 showing a serial bus controller according to an embodiment of the present invention, the serial bus controller, generally designated by 10A, comprises a competition result discriminator 11A for outputting a lost competition signal DB, a serial communication section 12A having a communication controller 13A for controlling the communication through the serial bus 17, and an interrupt demand controller 14 for generating an interrupt demand signal INT in the timing of the end-of-communication signal INTE supplied from the serial communication section 12A. The interrupt demand signal INT is supplied to a CPU 20 for an external interruption which does not include the information of the lost competition.

The competition discriminator 11A has therein a lost competition flag (LCF) 21 which is set at "1" in response to the detected lost competition to notify the CPU 20 of the occurrence of the lost competition. The communication controller 13A has a bus release controller 31A, implemented as a switching section, for releasing the serial communication bus 17 by a hardware configuration in response to the lost competition signal DB without the command from the CPU 20, and a slave mode setting section 32A for effecting slave mode setting procedures in response to the lost competition signal DB.

Figure 4:
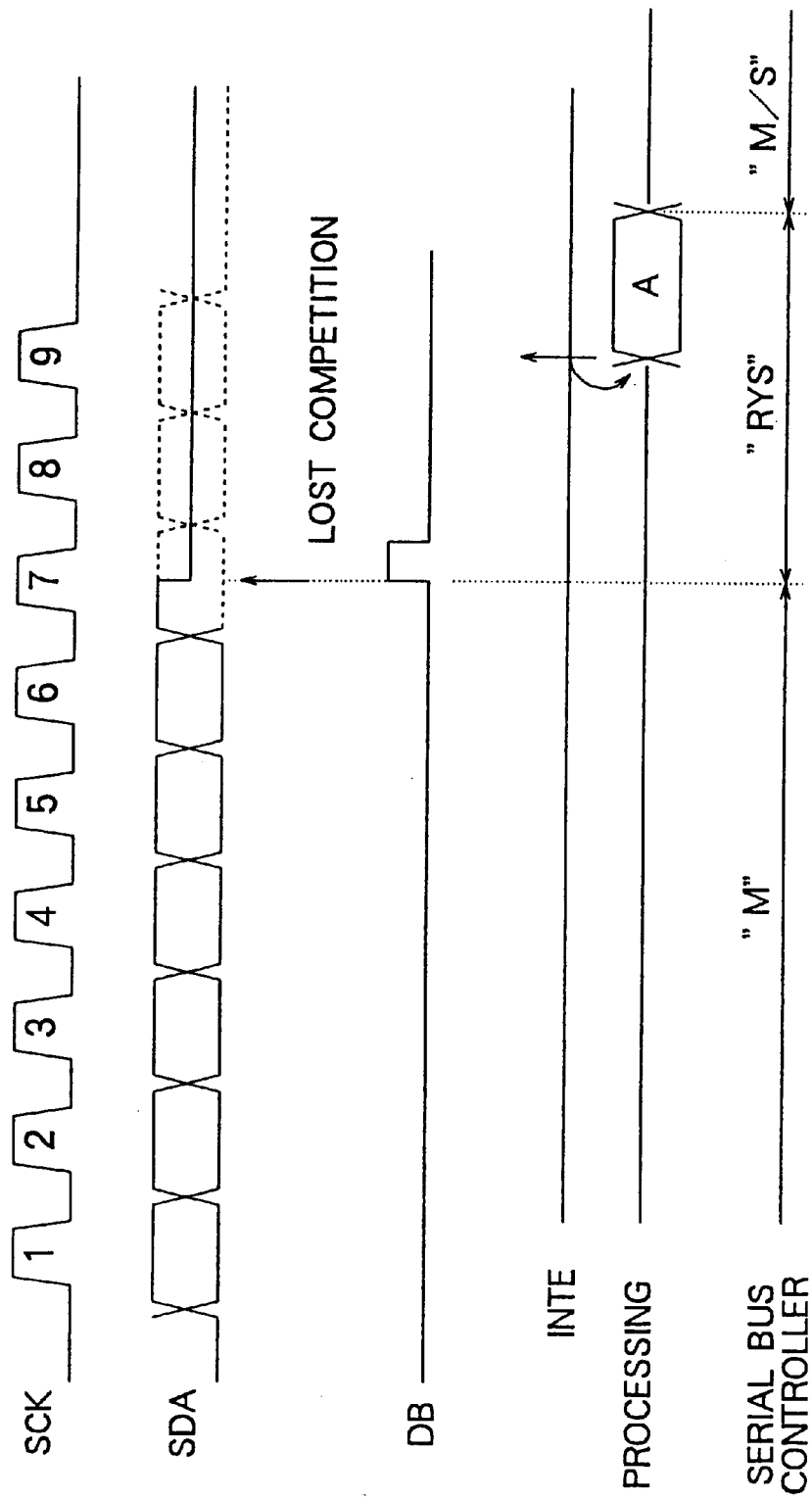
FIG. 4 is an example of a time-chart showing operation of the serial bus controller of FIG. 3.

Referring to FIG. 4, additionally to FIG. 3, an example of operations of the serial bus controller will be described.

Assume that the serial bus controller 10A is in the state of serial data communication (state "M" in FIG. 4) to reveal itself as one of the candidates for the master device. The competition result discriminator 11A receives a clock signal SCK and the contents of data SDA appearing on the serial communication bus 17, to compare them with a clock signal CKO and the contents of data DAO, respectively, to be output from the own station. If any difference is recognized in the comparison, occurrence of the lost competition is decided in the competition result discriminator 11A, which sets a lost competition flag LCF and generates a lost competition signal DB.

In response to the lost competition signal DB, the bus release controller 31A in the communication controller 13A releases the serial communication bus 17 by cut-off the connection to halt the output of the clock signal CKO and data DAO from the own station, in order not to interfere with the communication from the master device.

Further, the slave mode setting section 32A turns into a slave preparation mode in response to the lost competition signal DB to receive data from the serial communication bus 17 and compare the address specified by the received data against the own address. If a coincidence is detected therebetween, the slave mode setting section 32A knows that the own station is assigned a slave device by the master device, and responds to the master device through the serial communication bus 17. Thus, the serial bus controller 10A can move immediately into a waiting state as the slave device ("RYS" in FIG. 4) without delay, since the communication bus 17 is already released by the hardware configuration upon occurrence of the lost competition without the command from the CPU 20.

An interrupt demand controller 14 receives the lost competition signal DB from the competition result discriminator 11A, and supplies an interrupt demand signal INT to the CPU 20 in the timing of an end-of-communication signal INTE supplied from a serial communication section 12A. In the serial communication system in general, end-of-communication signal is generated at the end of each communication frame. The interrupt demand signal INT is thus supplied to the CPU at this timing.

The slave mode setting section 32A performs an after-treatment "A" in FIG. 4 for the failed communication which becomes due as a result of the lost competition. The after-treatment "A" is conducted during the time interval while the processing for the interrupt demand signal INT is performed in the CPU 20. The after-treatment "A" includes end-of-communication procedures including communication preparation procedures for a slave device which may be possibly requested by the master device, and preparation procedures for the next communication. The CPU 20 knows the lost competition from the lost competition flag LCF before processing for the interrupt demand signal INT. If the lost competition flag LCF is set, the CPU prepares retransfer of data or other procedures necessitated by the lost competition. On the other hand, if the lost competition flag LCF is not set, a normal end-of-communication is decided in the CPU by receiving the interrupt demand signal INT.

As described above, since the serial bus controller 10A according to the present embodiment has the competition result discriminator which generates the lost competition signal by comparing the serial data appearing on the serial communication bus against the serial data output from the own station, and a hardware device for performing the release of the communication bus in response to the lost competition signal, delay in releasing the serial communication bus can be eliminated, and troubles in the serial data communication from the master device can be avoided.

Further, since it is possible to respond to assignment of a slave device by the master device without delay in the serial bus controller, the communication disabled period caused by lacking a slave device can be avoided.

Furthermore, since the lost competition interrupt is processed in the timing of the normal end-of-communication interrupt, burdens on processing programs, together with the program development burdens, can be reduced.

Since the above embodiments are, described only for examples, the present invention is not limited to the above embodiments and various modifications or alterations can be easily made therefrom by those skilled in the art without departing from the scope of the present invention.

What is claimed is:

1. A serial bus controller for controlling serial data communication transmitted through a serial communication bus connected to a plurality of computer stations each constituting a candidate for a master device and a slave device, said serial bus controller comprising:

a communication controller for outputting a first serial data to reveal the corresponding computer station as a candidate for the master device;

a competition result discriminator for comparing said first serial data with second serial data appearing on the serial communication bus to output a lost competition signal upon detecting the difference between said first serial data and said second serial data; and a hardware device including a bus release controller for releasing the serial communication bus in response to said lost competition signal, wherein the lost competition signal is output directly from the competition result discriminator to the hardware device.

2. A serial bus controller as defined in claim 1 wherein said hardware device further includes a slave mode setting section for setting a slave mode in response to said lost competition signal, wherein said slave mode setting section sets the own station to a state of the slave device based on said second serial data.

3. A serial bus controller as defined in claim 1 wherein said competition result discriminator sets a lost competition flag upon detecting the difference between said first serial data and said second serial data.

4. A serial bus controller as defined in claim 1 further comprising an interrupt demand controller for outputting an interrupt demand signal in a timing of an end-of-communication signal after occurrence of said lost competition signal.

5. The serial bus controller as defined in claim 3, wherein said competition result discriminator sets the lost competition flag to notify a CPU of the occurrence of the lost competition.

6. The serial bus controller as defined in claim 4, wherein the interrupt demand controller outputs the interrupt demand signal to a CPU.

7. A method for controlling serial data communication transmitted through a serial communication bus connected to a plurality of computer stations each constituting a candidate for a master device and a slave device using a serial bus controller, comprising:

outputting a first serial data from a communication controller to reveal the corresponding computer station as a candidate for the master device;

comparing said first serial data with second serial data appearing on the serial communication bus and outputting a lost competition signal directly to a hardware device including a bus release controller upon detecting the difference between said first serial data and said second serial data; and releasing the serial communication bus using said bus release controller in response to said lost competition signal.

8. The method of claim 7 further comprising:

setting a slave mode of the own station of the serial bus controller to a state of the slave device based on the second serial data in response to the lost competition signal.

9. The method of claim 7, further comprising:

setting a lost competition flag upon detecting the difference between the first serial data and the second serial data to notify a CPU of the occurrence of the lost competition.

10. The method of claim 7, further comprising:

outputting an interrupt demand signal to a CPU in a timing of an end-of-communication signal after occurrence of the lost competition signal.

* * * * *